United States Patent [19]
Williams

[11] Patent Number: 5,517,428
[45] Date of Patent: May 14, 1996

[54] OPTIMIZING A PIPING SYSTEM

[76] Inventor: David Williams, 7533 Briar Rose, Houston, Tex. 77063

[21] Appl. No.: 236,087

[22] Filed: May 2, 1994

[51] Int. Cl.$^6$ .................................................. G06F 17/50
[52] U.S. Cl. .......................... 364/512; 364/188; 395/921
[58] Field of Search ..................................... 364/148, 188, 364/189, 468, 512, 578, 510, 221.2, 223.6, 226.7, 917.96, 916.3, 920.2, 921.4–921.7, 505; 395/919, 920, 921, 923

[56] References Cited

U.S. PATENT DOCUMENTS

| | | | |
|---|---|---|---|
| 3,867,616 | 2/1975 | Korelitz et al. | 364/512 |
| 4,181,954 | 1/1980 | Rosenthal et al. | 364/512 |
| 4,858,146 | 8/1989 | Shebini | 364/512 |
| 4,862,345 | 8/1989 | LeKron | 364/188 |

OTHER PUBLICATIONS

Wada et al. Proc. Inter. Workshop on Industrial Applications of Machine Visions and Machine Intelligence, Feb. 87, pp. 3–6.

*Primary Examiner*—Roy N. Envall, Jr.
*Assistant Examiner*—Steven R. Garland

[57] ABSTRACT

This invention relates to a structural optimization method, specifically to an optimization method that will minimize the weight of a piping system and satisfy the design constraints. This invention utilizes the information generated by a computer-aided design (CAD) program as input to the optimization algorithm. This information is first used to check a historical data base for systems that have been previously optimized. If a duplicate is found, the process is stopped. If the historical data base does not have a duplicate the next step is to optimize the proposed piping system. The method uses an algorithm which can be applied to a many-terminal piping system as encountered in petroleum and chemical plant environments.

3 Claims, 7 Drawing Sheets

OPTIMIZING A PIPING SYSTEM

BACKGROUND

1. Field of Invention

This invention relates to a piping system as encountered in a refinery or chemical plant, power plant, or buildings.

2. Description of Prior Art

The objective of this invention is to develop a design method which will arrange the shape of a piping system into the most economical system and satisfy the constraints. The most economical design in this text will be the least weight design. Since a large percentage of the cost of a refinery or chemical plant is due to the fabrication and erection of the many piping systems, a design method minimizing the weight would increase the competitiveness of the construction industry not only at the bidding stage but also at construction stage of the project.

Heretofore, the design of a refinery or chemical plant has been typically a trial and error affair. The design of the piping systems usually begins with the planning stage where the draftsman arranges the piping to satisfy the physical constraints such as support locations, interferences with equipment and existing piping, and client specifications. The initial design is then analyzed by a piping engineer using one of the numerous analytical software programs. These programs calculate the stresses in the pipe wall of the piping system and the forces and moments at the terminal points. The design constraints are dictated by industry standards such as ANSI B31.3 and ANSI B31.1 and the experience of the piping engineer. These industry standards require an analysis of the dead weight loading of the piping system to determine the stress in the pipe wall and a thermal analysis to determine the stress due to thermal expansion of the piping system. More often than not the piping system is not properly supported or has excessive thermal stress in the pipe wall so that the initial design must be rearranged by the engineer in concert with the draftsman. This iteration may be repeated numerous times before the piping system satisfies all of the design constraints and physical constraints. For a large project the manhours expended for analyzing and rearranging the piping systems can be enormous. The above synopsis assumes that the design can be brought to heel. For a cantankerous piping system, the gap between what can be done to satisfy the physical constraints and what must be done to satisfy the design constraints may be large. If the draftsman must rearrange other piping systems to accommodate this one cantankerous system, then the schedule of the project may be impaired and the judgement of the engineer questioned. The question that arises is this the only arrangement that will work? The engineer must rely largely on his experience to justify his position. What is needed, therefore, is a design method that will arrange the piping system for the least weight design and satisfy both the physical constraints and the design constraints. This would eliminate the precarious situation the engineer finds himself.

Reducing the stress in the piping system is only one piece of the puzzle for the engineer. If the piping system terminates at equipment such as a steam turbine, pump, centrifugal compressor, heat exchanger, or a tower, the manufacturer will restrict the forces and moments acting on the terminal point of the equipment. This is necessary to ensure that the equipment will operate properly in the field without excessive maintenance and costly down time. To find a solution, the piping system is rearranged and support locations moved many times in order to relieve the strain at the terminal point. This hunt and peck procedure can drag on for weeks for a large piece of machinery. The gap between what can be done to satisfy the physical constraints and what must be done to reduce the forces and moments at the terminal points begins to widen even further. What is needed is a design method which will arrange the piping system for the least weight, satisfy the physical constraints, satisfy the design constraints, and keep the forces and moments at the terminal below the manufacturers allowable.

Somewhere down the critical path, the process engineers will review the piping system for pressure drop. If the engineer has a piping arrangement that will satisfy all the above criterion, the pressure drop may be excessive. So what is needed is a design method that will arrange the piping system for least weight, satisfy the physical constraints, satisfy the design constraints, keep the forces and moments at the terminal below the manufactures allowable, and minimize the pressure drop of the system.

An engineer can not possibly keep track of all these variables without assistance from a computer-aided design method. The prior art is rich with analytical software but what is needed is a design method recommending a possible solution or more important that no piping arrangement will ever satisfy the constraints. Many hours are expended on trial and error and hunt and peck methods to find out later that the piping system will never work. But this can not be ascertained until many hours are wasted analyzing the piping system.

Many projects today are utilizing computer-aided design (CAD) to produce the drawings for construction. The software used in the shot-in-the-dark methods above require much input. Many hours are expended in modelling a complex piping system. Although much of the information needed to model a piping system is generated on the CAD system, drawings are usually produced and the engineer must glean from the drawings the input for the analytical piping software package. My invention would bypass the pick-and-shovel work of the engineer at the input stage. My invention will not reduce the amount of input to describe a piping system but will free the engineer's time for problem solving.

Since the beginning of piping analysis, many thousands if not hundreds of thousands of piping systems have been examined. Unfortunately, these successful designs have not been categorized and filed away for further use. My invention would create a data base where successful designs would be stored. The input of a new proposed piping system would be compared to this data base for a possible match. The match would not necessarily be exact, but by defining upper and lower bounds, the engineer may find a system already solved. Then applying his judgement, he could accept or reject the solved problem depending on criticality of the proposed piping system. This has the potential of saving many manhours as the data base enlarges.

Accordingly, several objects and advantages of my invention are as follows:

1. By comparing a new proposed piping system to a historical data base, the new system may be already solved saving many manhours,
2. If the proposed piping system is new with regard to geometry or design conditions, then the system would be optimized and not analyzed. This would eliminate the hunt and peck systems now in use,
3. By eliminating the pick-and-shove work between the CAD system and my invention, the engineer's time is freed to solve problems, 4. By optimizing instead of analyzing, the engineer has a tool by which he can emphatically declare a design impracticable. This will reduce the friction between plaintiff and defendant creating a more harmonious project,
5. By optimizing at the beginning of the project, the engineer can convince other engineering disciplines that changes they may make will only make the design worse,
6. By exchanging data between my invention and the CAD system, the modified piping system can be checked for violated physical constraints saving many manhours,
7. By using the state-of-the-art CAD systems, the draftsman may be eliminated entirely from the loop on critical systems,
8. By utilizing a systems approach to a complicated design, any piping system can be analyzed.

Further objects and advantages of my invention will become apparent from consideration of the flowcharts and ensuing description of it.

DESCRIPTION OF THE EMBODIMENT

Figure 1:
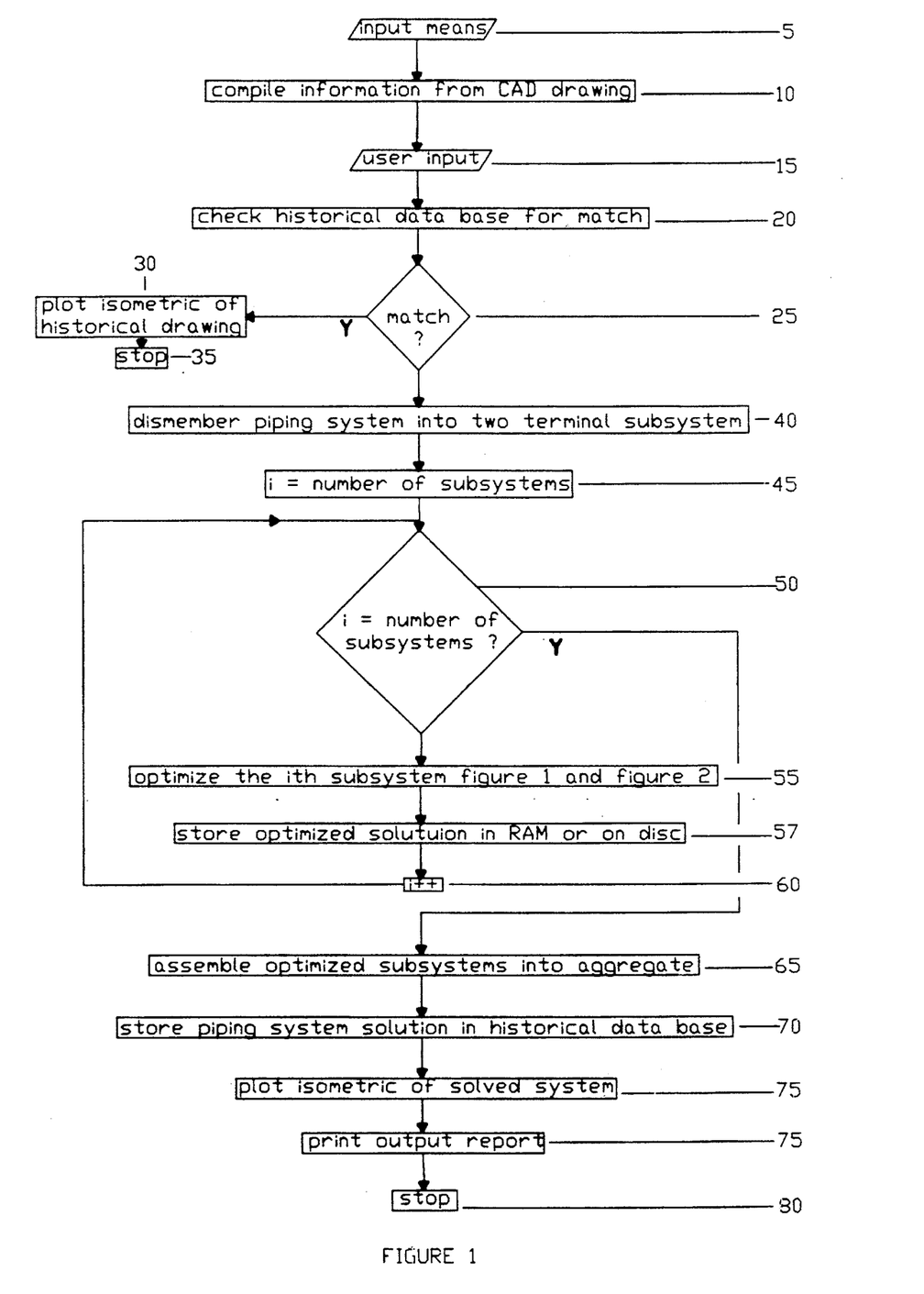
FIG. 1 Main flowchart.
Figure 4:
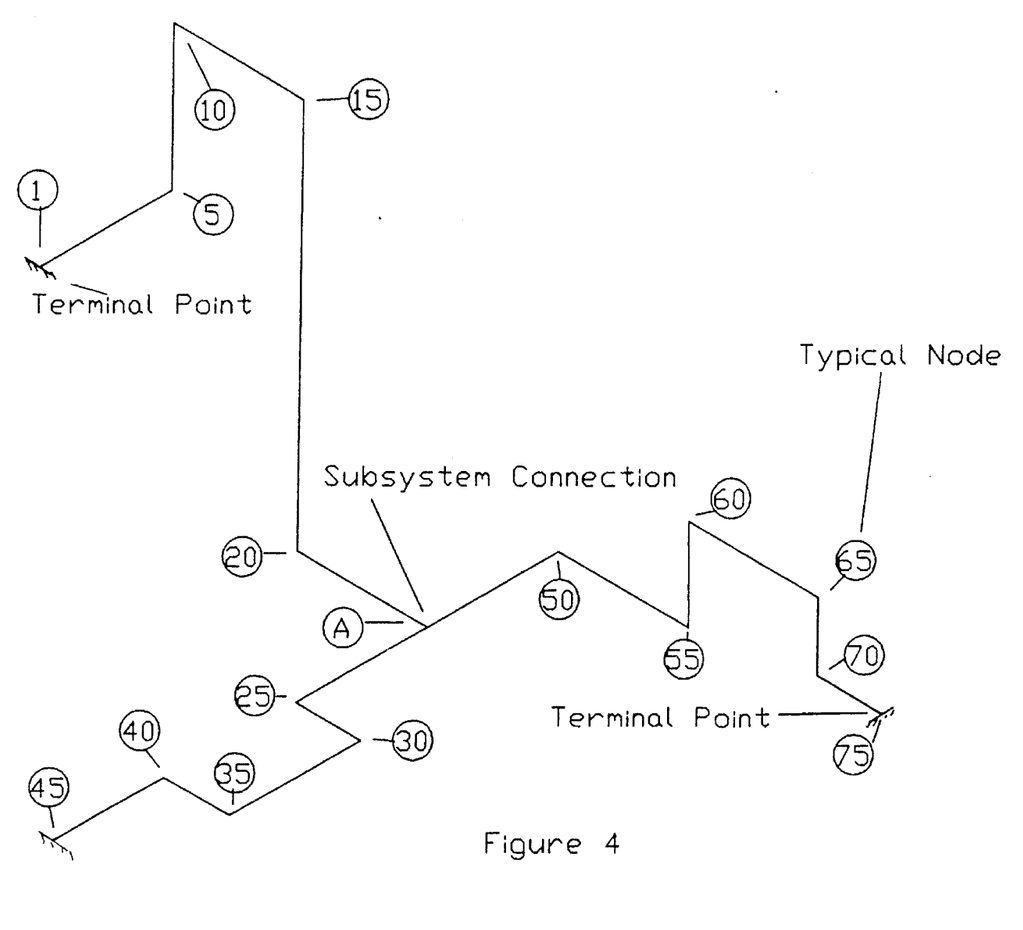
FIG. 4 Isometric view of piping system.

Starting with FIG. 1 at the top and working down through the flowchart, point 5 is the operation of generating the CAD piping plans and sections by a CAD technician. At this point the CAD technician would attach to the drawings icons which would indicate the terminal points and subsystem connections. Point 10 refers to the interface between the CAD system developing the CAD drawings and my program. The CAD technician generates piping plans and sections for the project. These drawings include, among other things, all of the piping systems drawn to scale, structural steel, line numbers identifying each piping system, and terminal points for each piping system. These items have sufficient information to generate the input for my program. My program scans this CAD drawing so that a phantom isometric piping drawing such as FIG. 4 is generated and stored either on disc or random access memory (RAM). On this isometric drawing the nodes-circles with numeric characters inside, subsystem connections-circles with alphabetic characters inside, and terminal points-nodes 1, 45, 75 are stored for future use by my program. The nodes always appear at break points where the piping system has a change in either geometry, intrinsic properties such as pipe diameter, pipe wall thickness, material, temperature, pressure, and type or locations of structural support members. Nodes can also appear when additional information is required by the user. The changes in the dimensions between nodes are also scanned from the CAD drawing and attached to the isometric drawing. Line numbers are removed from the CAD drawing and attached to the isometric drawing. The line numbers included on the CAD piping plans and sections have different formats that differ from company to company but all will indicate the nominal diameter of the pipe, the piping specification designation, sometimes the insulation thickness, and a unique number tying the piping system to the line table. The piping specification designation references the document, which will provide the material of the piping system, branch attachment information, pipe wall thickness or schedule, bend radius of the elbows, and reduction to different pipe sizes information. The line table is a roster of all the lines on the project showing their temperature, pressure, and upset conditions. A typical line number on a CAD drawing might read 4"-2005-ASA. The first number indicates the nominal pipe diameter, and the second, the unique number to tie the piping system to the line table. In the third sequence of characters, the piping specification designation is used to tie the piping specification designation to the pipe specification document. The piping specification document and line table will be stored on disc for access by my program.

Point 15 is an interruption to the flow so that the user can converse with the program. User input includes the following:

1. Forces and moments at the fixed global axis system. See FIG. 6. These tractions are fixed either by the equipment loading or some other design constraint,
2. Upper and lower stress range. Ideally the piping system should have highest possible stress. However this may not be possible and still solve the problem. The upper stress is the allowable dictated by the industrial code. The lower is the lowest stress the user will tolerate,
3. Maximum coordinate tolerances. This input is for the historical data base. The chances of finding an exact match in the historical data base to the proposed piping system are remote. By setting an upper and lower bound on the dimensions, an approximate match may be found. The engineer can then use his experience and judgement to either reject this match or use it depending on the criticality of the piping system, and
4. Feasibility tolerance.

Point 20 is the program's search for a match in the historical data base using the dimensional tolerances supplied by the user.

The decision point 25 determines the branch to take if a match is found in the historical data base based on the dimensional tolerances supplied by the user. If the answer is yes, the historical plans and sections are plotted or displayed on the monitor. The output report including stresses and forces and moments at each piping element point is printed. This task is accomplished at point 30. If a match cannot be found, then the algorithm to find the optimum solution is started.

Figure 7:
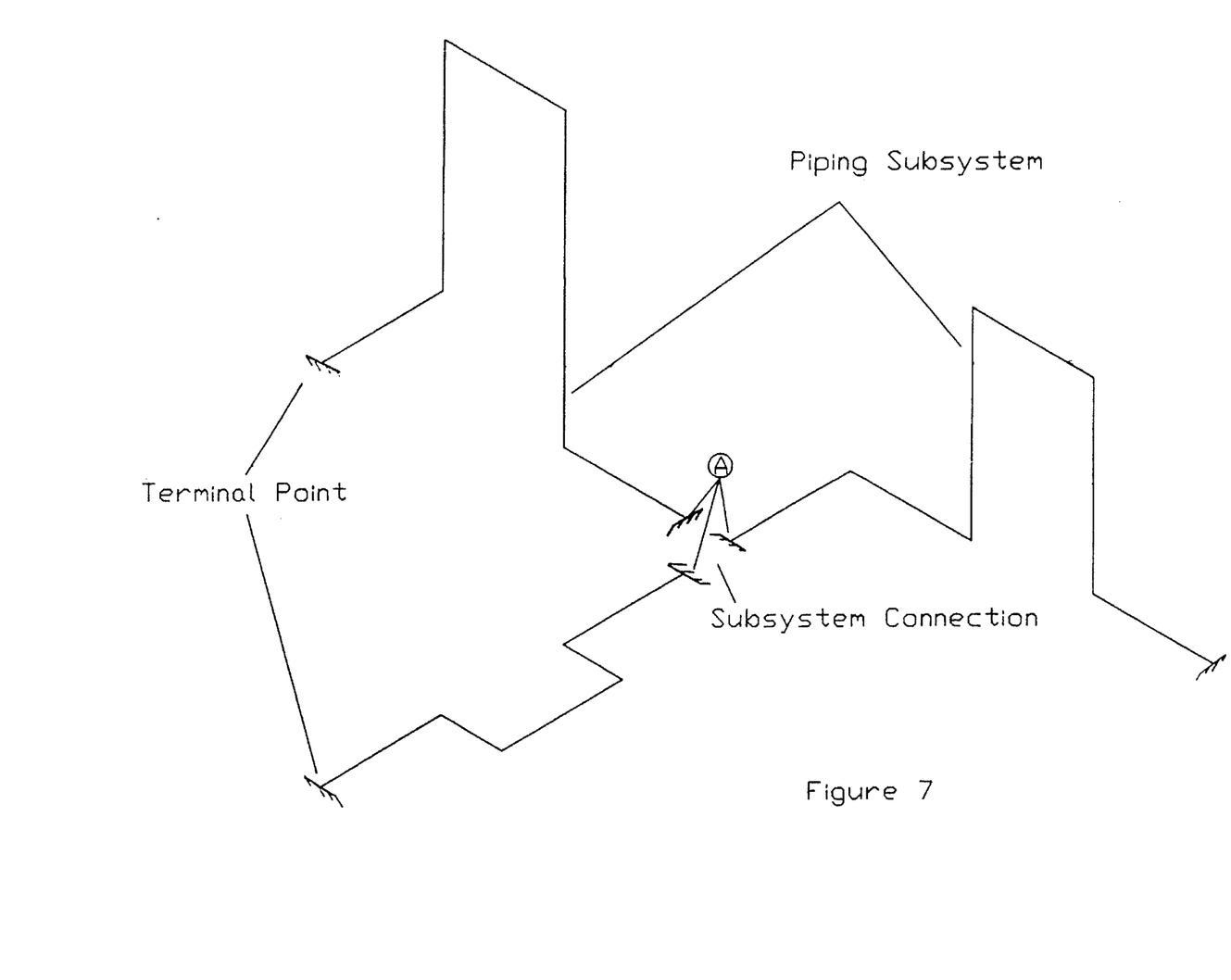
FIG. 7 Dismembered multi-terminal piping system.

Point 40 the piping system of FIG. 4 is dismembered into many two-terminal piping systems as shown in FIG. 7.

Point 50 is the entrance into the loop where each two-terminal subsystem is optimized. The loop continues until all subsystems are optimized or a subsystem is judged as recalcitrant.

Figure 2:
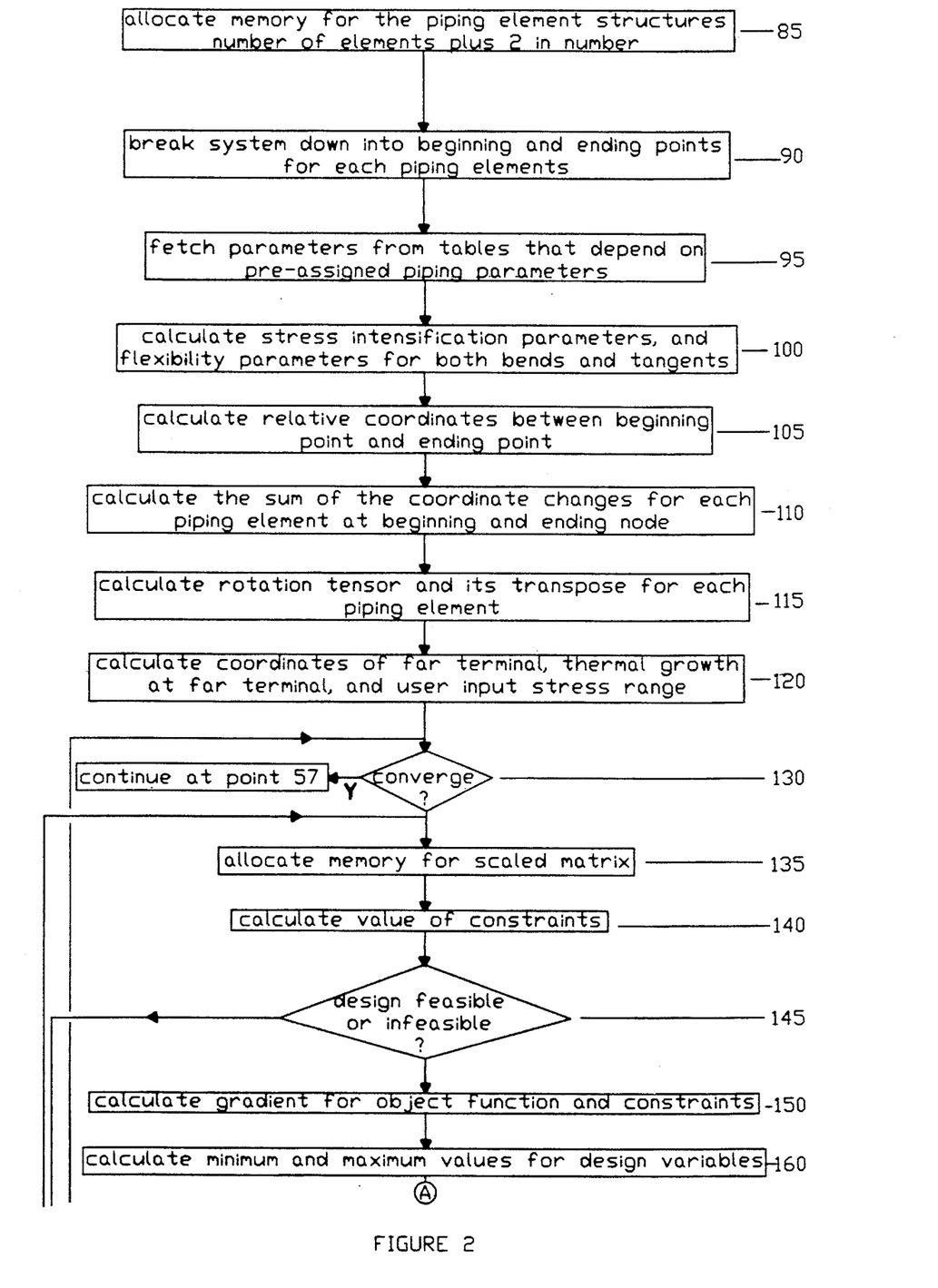
FIG. 2 Flowchart for optimizing a two-terminal piping system.
Figure 3:
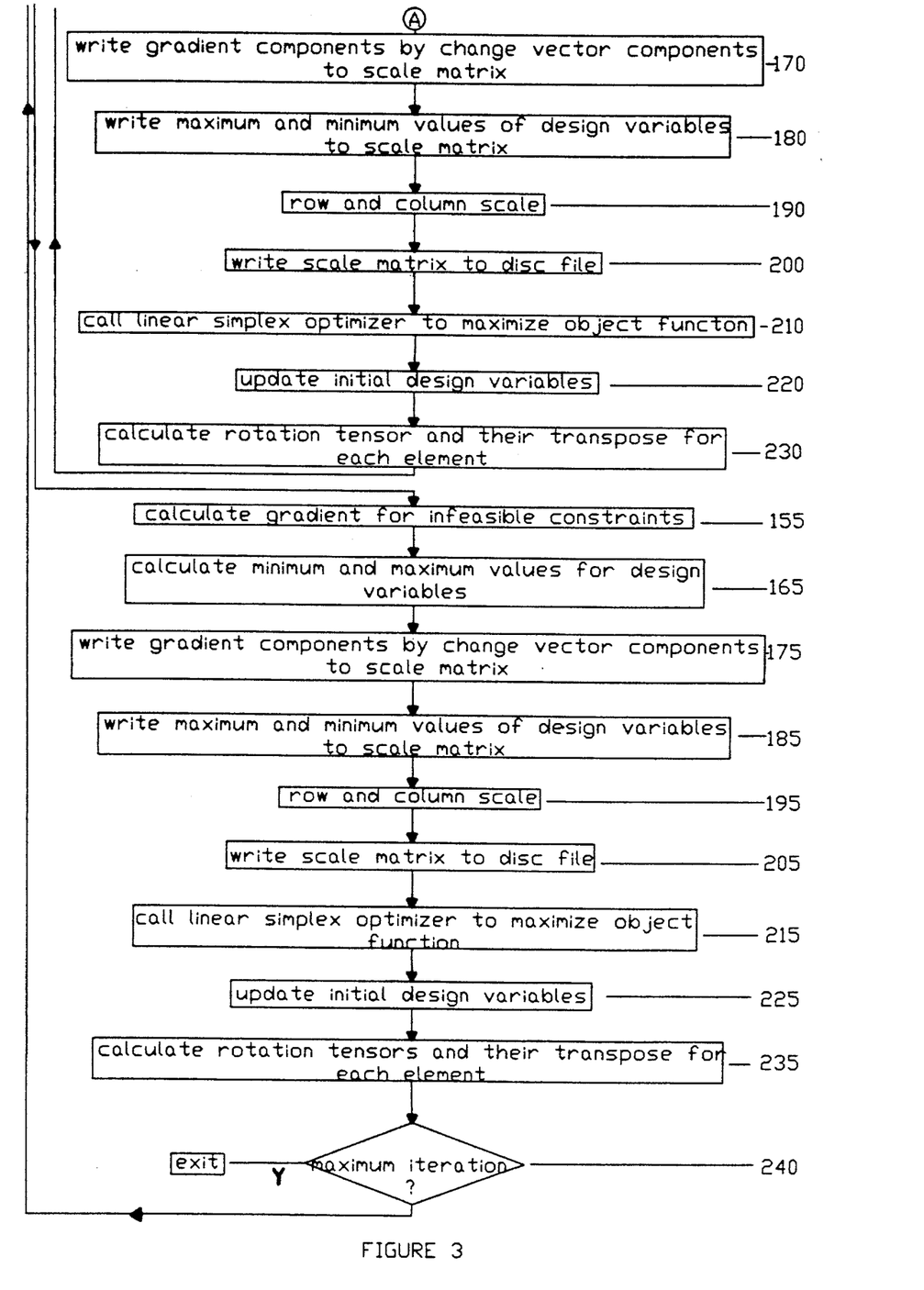
FIG. 3 Continuation of FIG. 2.

Point 55 is the optimization subroutine explained by FIG. 2 and FIG. 3. After each subsystem is optimized, the critical information is stored either on disc or RAM, point 57 of FIG. 1.

Point 65 is the place where the solved subsystems are assembled into the original aggregate. To optimize a many-terminal system, the system can either be relaxed using the method of Hardy Cross, or partitioned as described in the article "Linear Programming" by Kurt Eisemann in the *Quarterly of Applied Mathematics,* or Gabiel Kron's method of diakoptics.

Storing the solved system into the historical data base is accomplished at point 70.

Finally, the solved piping system is plotted on a plotter or displayed on the video monitor. The design variables, stresses, and tractions are printed.

A description of the optimization of a two-terminal system will be described. FIG. 2 and FIG. 3 refer. In the discussion that follows, a many-terminal piping system is assumed with possibly many subsystem connections. If a two-terminal piping system is to be optimized, the subsystem connection is a terminal connection.

Point 85 is in C language a pointer to an array of structures. My program counts the number of pipe elements, i.e., bends and tangents. The number of structures allocated is the number of pipe elements plus two. Each pipe element has its own structure which contains the following:

1. Schedule-ANSI designation for pipe thickness, i.e., XXS, STD, 80, 80S etc.,
2. Material-material at that specific node location, i.e., carbon steel, stainless steel, chrome moly etc.,
3. Type-a number indicating tangent, long radius bend, short radius bend, of other fittings such as a 45 deg. bend or miter,
4. Number of pipe elements-bends and tangents,
5. Number of bends-number of bends in system,
6. Nominal OD-nominal outside diameter of pipe at the specific location,
7. OD-actual outside diameter of piping system,
8. Inside diameter-actual outside diameter minus 2 times the thickness of pipe,
9. Wall-pipe wall thickness,
10. I-moment of inertia of pipe,
11. Z-section modulus of pipe,
12. E-Young's modulus,
13. Weight of water-weight of contents in the piping system,
14. Temp-temperature at that node,
15. Thermal coefficient-coefficient for thermal expansion of the material at the specific node,
16. Allowable stress-allowable stress allowed by industry standards, i.e. ANSI B31.1, B31.1,
17. Bend radius-long or short radius needed in bend flexibility calculations,
18. In plane stress intensification values-needed for stress calculations at bends,
19. Out of plane stress intensification values-needed for stress calculations at bends,
20. Rotation tensor 3 by 3 matrix-rotate bend to local coordinate system,
21. Transpose tensor 3 by 3 matrix-transform bend back to global coordinate system,
22. Rotational tensor for tangent leading into bend-rotate tangent to local coordinate system,
23. Transpose tensor for tangent leading into bend-transform tangent back to global coordinate system,
24. Rotational tensor for tangent exiting from bend-rotate tangent to local coordinate system,
25. Transform tensor for tangent exiting from bend-transform tangent back to global coordinate system,
26. Lx-x coordinate change between piping element points,
27. Ly-y coordinate change between piping element points,
28. Lz-z coordinate change between piping element points,
29. Absolute length between piping element points,
30. Sum_x-sum of the global x coordinates,
31. Sum_y-sum of the global y coordinates,
32. Sum_z-sum of the global z coordinates,
33. Fx-shear in x direction at each piping element points,
34. Fy-shear in y direction at each piping element points,
35. Fz-shear in z direction at each piping element points,
36. Mx-moment in x direction at each piping element points,
37. My-moment in y direction at each piping element points,
38. Mz-moment in z direction at each piping element points,
39. Sum of the deflections in the x direction at each points,
40. Sum of the deflections in the y direction at each points,
41. Sum of the deflection in the z direction at each points,
42. Sum of the rotations in the x direction at each points,
43. Sum of the rotations in the y direction at each points,
44. Sum of the rotations in the z direction at each points,
45. Local rotation in the x direction between points of piping elements,
46. Local rotation in the y direction between points of piping elements,
47. Local rotation in the z direction between points of piping elements,
48. Beginning stress-calculated stress at beginning piping element point,
49. Ending stress-calculated stress at ending piping element point,
50. Restraint in the x direction y/n,
51. Restraint in the y direction y/n,
52. Restraint in the z direction y/n,
53. Rotational restraints x direction y/n,
54. Rotational restraints y direction y/n, and
55. Rotational restraints z direction y/n.

At point 90, it is necessary to break the piping system into piping elements so that each element has a unique C language structure. FIG. 4 is an example of how each piping subsystem is separated into its individual elements. Each piping element has a beginning point and an ending point. These are indicated on FIG. 4 as heavy dark spots. Three design variables correspond to the change in the coordinates between the beginning point and ending point of each straight tangent. The bends have a fixed dimension and can not change. In FIG. 4 there are 5 straight tangents, so this problem would have fifteen design variables.

Point 95 is the process whereby the information carried along with the nodes such as dimensions, line numbers, and piping element type is used to extract the additional piping parameters from stored tables located either on disc or RAM. These addition parameters are stored in the structures. The following is the correspondence between the nodes of FIG. 4 and the pipe element structures:

| Nodes | C Structures |
| --- | --- |
| Schedule from piping specification | Item 1, item 9 |
| Nominal diameter from line number | Item 6, item 7 |
| Material from piping specification | Item 2 |
| Temperature from line table | Item 14 |
| Type-long radius bend, short radius bend, or tangent from CAD drawing | Item 3 |
| Translational restraints from CAD drawings | Item 50, item 51, item 52 |
| Rotation restraints from CAD drawings | Item 53, item 54, item 55 |

The following is the correspondence between items in column two above and the piping parameters extracted from the tables:

| Column 2 | From Tables |
| --- | --- |
| Item 1 and item 6 | Item 10, item 11, item 13, item 8 |
| Item 2 and Item 14 | Item 12, item 15, item 16 |
| Item 6 and item 3 | Item 17 |

Point 100 is the first of the calculation stage. The stress intensification factors both in plane and out of plane bending apply only to bends, mitered bends, and 45 deg elbows. If the type in the structure points to a long, short radius bend, or other bend type, then this evaluation is made and is stored in item 18 and item 19. The formulas that are used depend on the industrial standard governing the project. This is usually ANSI B31.3 or B31.1 and the formulas are found in the appendix of these codes.

Point 105 is the place where the relative coordinates are calculated for each piping element point. The nodes, FIG. 4, carry the changes in the dimensions but do not locate where the straight tangent attaches to the bend or where the bend ends and the tangent begins. Since the stress and the displacements for the tangents and bends will be different, the relative position between the beginning and ending points of each piping element must be evaluated. These coordinates are used to calculate the sum of the global coordinates with respect to the orgin at the beginning and ending point of each piping element. These coordinates are stored in item 26, item 27, and item 28 of the structure. The absolute length between these two points is stored in item 29.

Figure 5:
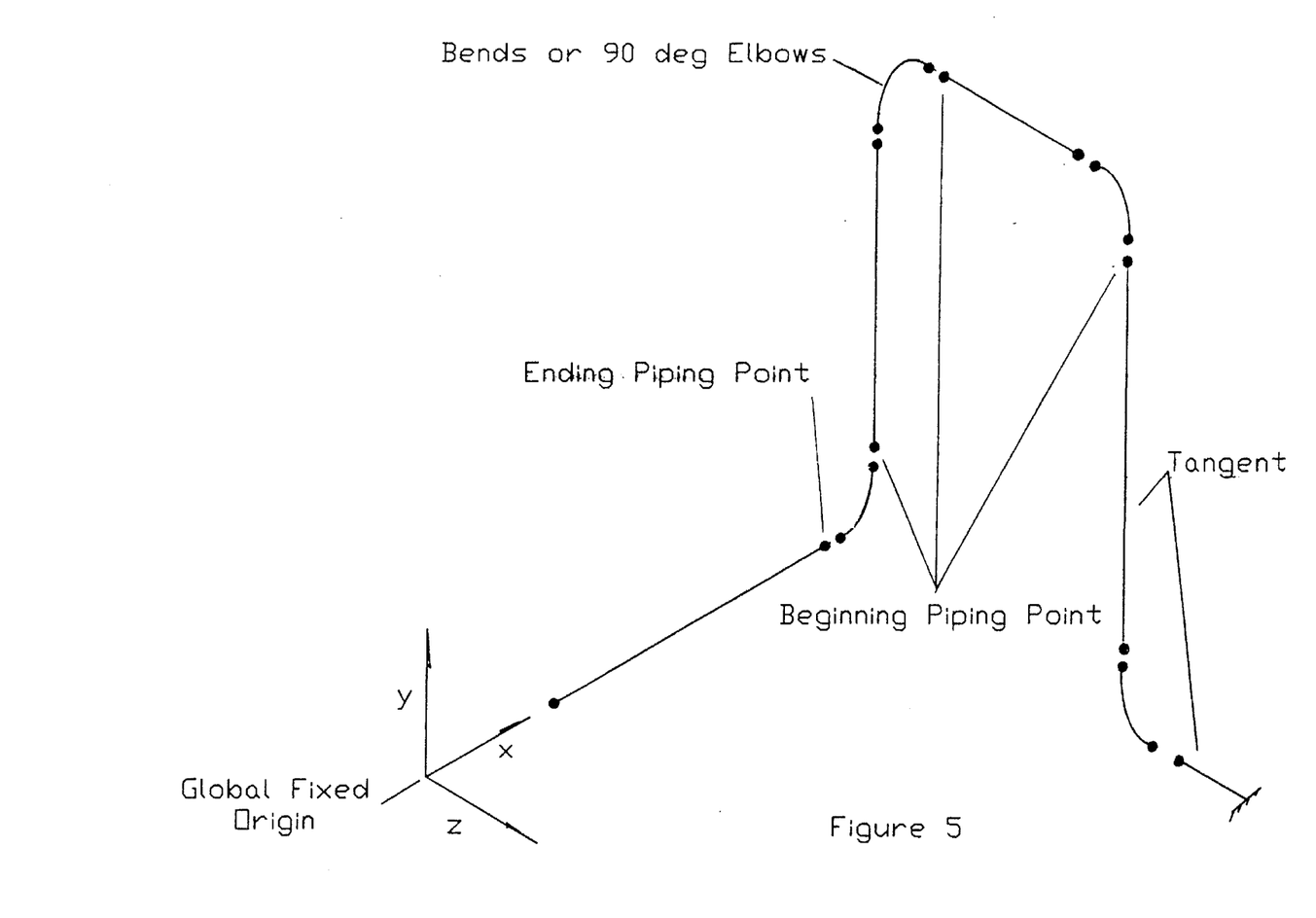
FIG. 5 Isometric view showing beginning and ending piping points.

Point 110 assigns values to the variables sum__x, sum__y, sum__z. These variables are a running tally of the changes between each piping element point as evaluated at point 105. The piping system is traversed starting at the origin as shown in FIG. 5 and the tally accumulates consecutively to the next piping element point. The tally is complete when the far terminal point is reached. These summations provide the means by which the moments can be moved from the origin to the any piping element point. With these moments and shears, the deflections, rotations, and stresses are calculated at that specific piping element point. The sum of the coordinates are stored in item 30, item 31, item 32 of the structure.

Figure 6:
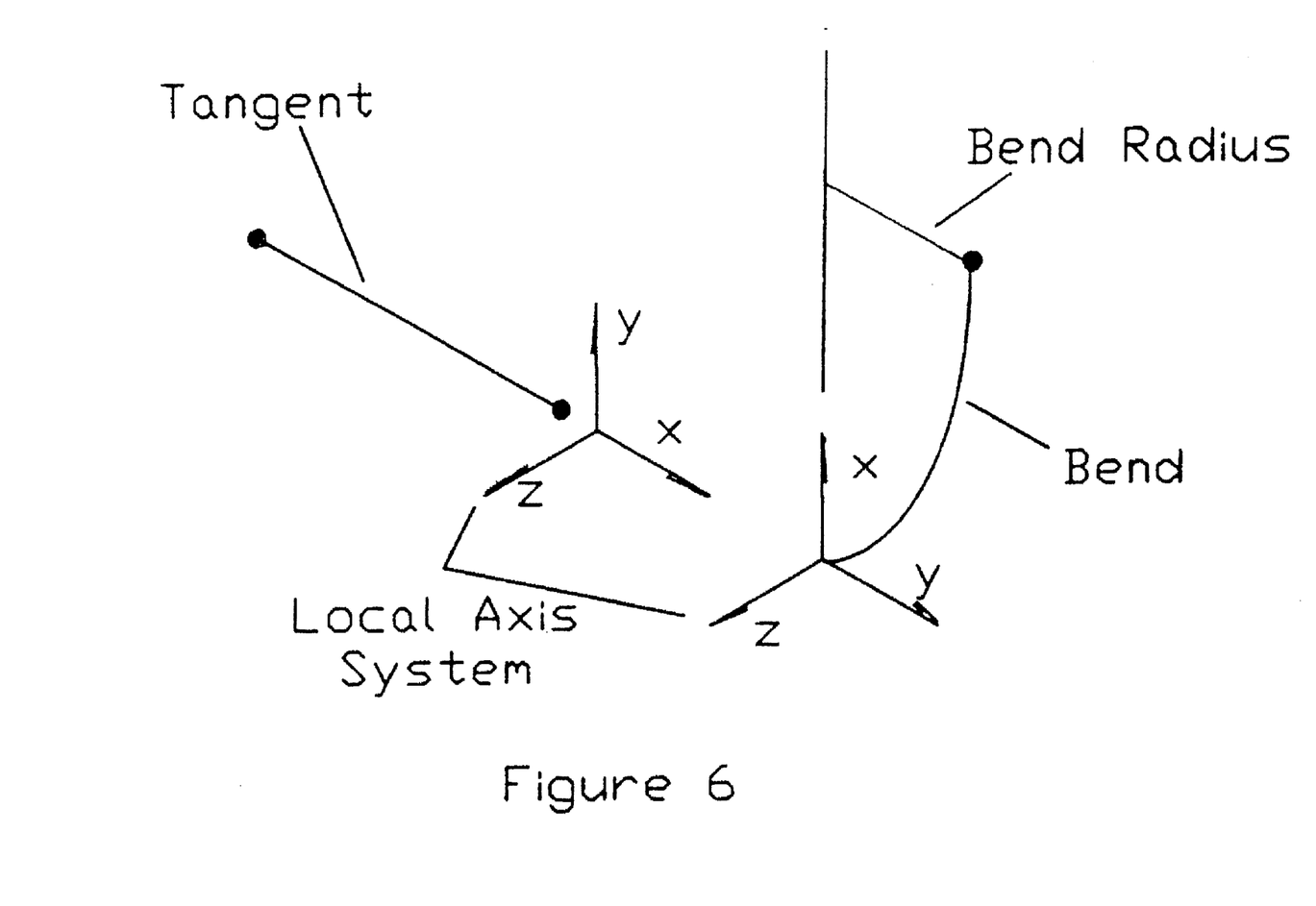
FIG. 6 Local coordinate system for straight tangent and bend.

Point 115 evaluates the tensors necessary to rotate the any piping element in space. All axis systems are right-handed. The local axis system for each piping element is orientated with the principal planes as shown in FIG. 6. The formulas for calculating the tensor which will rotate the global axis system to the local axis system, FIG. 5, are, $$i'=i' \text{ dot } ii+i' \text{ dot } jj+i' \text{ dot } kk,$$

$$j'=j' \text{ dot } ii+j' \text{ dot } jj+j' \text{ dot } kk \text{ and}$$

$$k'=k' \text{ dot } ii+k' \text{ dot } jj+k' \text{ dot } kk.$$

where the primes refer to the local system and the unprimed letters refer to the global system.

The tensor for the tangent leading into a bend is stored in item 22 of the structure. The transpose for the tangent leading into the bend is stored in item 23 of the structure. The tensor for the tangent exiting the bend is stored in item 24 of the structure. The transpose for the tangent exiting the bend is stored in item 25 of the structure. The tensor for the bend is stored in item 20 of the structure. The transpose for the bend is stored in item 21.

Point 120 is the place where the distance between the terminal point and the subsystem connection, thermal growth in the x, y, z direction, and user input such as upper and lower stress range is stored. If the terminal point at node A is disconnected as shown in FIG. 7, the thermal growth in the x, y, z direction for each subsystem is equal to the coefficient of thermal expansion times the x, y, z distance between the terminal point and connection A.

Point 130 determines the branch to take if the problem has converged. If the answer is yes, the program exits the routine and starts point 57 as shown in FIG. 1. If the answer is no, then the algorithm continues to iterate until convergence is reached or the subsystem is judged as recalcitrant.

Point 135 allocates memory for an array called scale__matrix. This array is used to store gradient coefficients for each linearized constraint, scale factors, and values of the side constraints. This array is later scaled by row and column to help eliminate distortion in the system of equations.

Point 140 calculates the value of each constraint. This is a subroutine that is used many times for gradient calculations and system feasibility calculations. The identification of the piping system constraints is one of the most important phases of the optimization program. The following is a list of the constraints that have been identified:

1. Total deflections in the x, y, and z directions of the piping subsystem with known forces and moments at the origin must equal the x, y, z thermal expansion due temperature at the subsystem connection plus terminal point growth. In other words, the piping system strain must equal the thermal growth in any direction plus terminal point movement,
2. Total rotations in the x, y, z directions of the piping subsystem with known forces and moments at the origin must equal to the terminal point rotations,
3. The straight line distance between terminal point and subsystem connections of the modified system minus the actual straight line distance between terminal points must equal to zero. In other words, the optimized piping system must physically fit between the terminal points,
4. The dot product between the tangents entering and exiting the elbow, 45 deg. elbow, or any other angle fitting must equal the angle of the fitting,
5. The stress at any point in the system must be larger than the minimum stress input by the user,
6. The stress at any point in the system must be less than the industrial code allowable, 7. The local rotations of any piping element must not be greater than non linear requirements assumed by the deflection and rotation equations, 8. The sum of the coordinates of the modified piping system in the x, y, z directions minus the actual coordinates must be zero, 9. Hydraulic constraints, 10. All of the tangent lengths must be equal to or greater than zero, and 11. Add equations for each node where constraints occur.

These constraints are not an-all inclusive list; many more may be identified.

The first two sets of constraints, the calculation of rotations and deflections, are the most difficult to evaluate. Since this algorithm could easily mire with a lengthy matrix inversion, the stiffness method of calculating displacements was abandoned for a older but faster method. The basic components of a piping system are the bend (90 deg., 45 deg. or other angles) and the straight tangents. All piping systems are derived from these two elements. The basic idea is to cantilever from the previous piping element to the next piping element by adding deflections and rotations due to rigid body rotation to the deflections and rotations due to bending at the ending point of the previous piping element to the next piping element beginning point. The entire piping system is traversed in this manner until the total global deflections and rotations at the subsystem connection are obtained. As stated above, the rotations and deflections at the subsystem connection due to these given forces and moments must equal the total thermal expansion of the piping system. The internal strain must equal the external thermal growth. These elements can be oriented in any plane. The problem: is how can equations be written for every possible orientation of these two elements. The first step to recognize that bends and straight tangents have three principal planes. If the flexibility is known for each principal plane, when forces and moments are imposed on each principal plane, the beam will deflect in these planes and will not carry over to other planes. The system is decoupled. The flexibilities for a straight has two planes in bending and the third in torsion. The bend on the other hand is more flexible than a straight tangent, and formulas for calculating the added flexibility in bending are found in the industry standards such as ANSI B31.3 or ANSI B31.1. The formulas for deflections and rotations due to shears and moments in all three planes can be found in *Pressure Vessel and Piping Design Collected Papers* 1927–1959 page 360. The tensor found in the individual piping element structures will transform the global coordinate system to the local piping element coordinate system. The transpose of this tensor will transform the local piping element coordinates to the global axis system. The global forces and moments at each piping element point have been calculated earlier and stored in the structures-items 36, item 37, and item 38. The method then is to rock the forces and moments referred to the global axis system at the beginning point for each piping element to the local piping element principal planes with the tensor, apply the flexibility to obtain deflections and rotations referred to local axis system at the ending point of the piping element, and rock the deflections and rotations back to the global axis system using the transpose. A running tabulation is kept in item 39, item 40, and item 41 for each piping element structure. Restraints are included by eliminating the deflection at the node where the restraint occurs. An additional constraint equation would then be written to obtain the force or moment acting on the system.

Point 145 determines the branch to take if design is feasible. For a design to be feasible, all constraints must be greater than zero. As with all numerical calculations, zero must be defined for the computer. If the point representing the design variables in a hyperspace is infeasible but is sufficiently close to the constraint boundary $g(x,y,z\ldots)=0$, then the constraint will be counted as feasible. The sufficiently close criterion is a magic number supplied by the user. The algorithm is iterative in nature so that, with any luck, the design variables can be pulled back into the feasible design space. For very difficult designs this number may be relatively large to obtain a feasible design. Later, to fine-tune the solution, this number can be much smaller. This subroutine requires an accurate calculation of the gradient for each constraint. This algorithm uses the least square method with five function evaluations. Wiley Professional, Reference and Trade Group publishes software that will differentiate a function.

Points 150 and 155 evaluate the gradients for each constraint for use in the linear optimization program.

A brief explanation of the algorithm will be given. The method used is a modified version of a method developed by Roman Baldur in an article "Structural Optimization By Inscribed Hyperspheres" published by the ASCE June, 1972. The basic mechanics of this method is first starting with either a feasible or infeasible design point represented as a vector in a multi-dimensional space add a displacement vector which will displace this initial design point to the center of the largest hypersphere that can fit between all linearized active constraints and linearized inactive constraints. An active constraint is a constraint where the design point lies on the negative side of $g(x,y,z\ldots)=0$. An inactive constraint is a constraint where the design point lies on the positive side of $g(x,y,z\ldots)=0$. The sum of the initial design vector and the displacement vector is the next improved design point. The simplex method of solving a system of underdetermined equations is used to obtain the components of the displacement vector. The iteration continues until either the infeasible design becomes feasible or the radius of the hypersphere in the feasible design space approaches zero indicating a minimum weight design. Inside the feasible design space, the object function-minimize weight-directs the hypersphere towards a minimum. As the hypersphere approaches a minimum, the radius approaches zero. The algorithm is stopped when the radius of the hypersphere is less than a tolerance. The method has some important advantages. First, there is a convergence criterion. Another advantage is that the movement of the design point is down the center of the feasible design space never colliding with an active constraint. Equality constraints can be modeled with no added difficulty.

The method has some serious drawbacks which are only side-stepped in the article: namely, for infeasible designs the method is not well-mannered and is inclined to avoid the feasible design space. My algorithm has made major modifications to ensure that the method will progress to the feasible region assuming a feasible design space exists. The first modification is to limit the displacement vector components in the feasible or infeasible space, and the second, is the elimination of the inactive constraints in the infeasible iteration. By eliminating all inactive constraints from the infeasible iteration, the algorithm is allowed to focus only on the constraints causing the grief. The points 160 and 165 accomplish this task. Points 160 and 165 are identical except that where the design is feasible, the object function is included, and where the design is infeasible, the object function is excluded. The object function is considered another constraint in this method of attack. For infeasible designs, scalers are calculated for each active constraint and stored in an array. The scaler for each constraint is the number when multiplied by the gradient for that constraint will position the point on the surface $g(x,y,z \ldots )=0$. The largest scaler is then picked from the array. If the largest scaler and its corresponding gradient are multiplied together and used as a possible displacement vector, this displacement would move across all the active constraints and arrive at $g(x,y,z \ldots 0)= 0$ for the largest scaler, and the point would be on the positive side of the remaining active constraints. This would ensure that all the active constraints are satisfied. The next step is to fetch the largest positive measure number and the largest negative measure number for each axis of all the gradients of all the active constraints. Two arrays exist: one to receive the largest negative measure number for each axis of all the gradients of all the active constraints, and one to receive the largest positive measure number for each axis of all the gradients of all the active constraints. So now the largest negative measure number and largest positive measure number for each axis are known. The two arrays are multiplied by the largest scaler, and this provides the bounds of the design variables.

Points 170 and 175 store the components of the gradient for each constraint in the scale_matrix array. Points 180 an 185 store the maximum and minimum displacement vector components, as discussed in point 160 and 165, in the scale_matrix array. After this information is assembled, the scaling operation can commence. My program uses the row and column scaling procedure. The objective in scaling is to reduce all nonzero coefficients to the same order of magnitude, if possible, by allowable row-scaling and column-scaling operations. This purportedly reduces the distortion in the system of equations. This is only one of the many methods to scale a set of equations. This method was chosen in order to eliminate as many costly constraint evaluations as possible. Point 190 and 195 refer.

Points 200 and 205 write all this information to a disc file so that the linear optimization program Lindo can find a feasible solution. Lindo is a proprietary software package published by Lindo Systems Inc. Chicago, Ill.

Point 210 and 215 call Lindo. The program returns the components of the displacement vector that maximizes the radius of the hypersphere in the infeasible case and minimizes the radius for the feasible case. Lindo writes the output to a disc file.

Point 220 and 225 call a subroutine to strip the components of the displacement vector and the maximum or minimum radius from the output file generated by Lindo. The components of the displacement vector are added to the original design vector to obtain the next design point. The new design point is used in the next iteration. The radius of the hypersphere is used to determine if the problem has converged.

Since the original design has been modified, some of the elements of the piping element structure that depend on design variable changes must be modified for the next iteration. Items 20 through 32 of the piping structures must be evaluated again at point 230 and 235 because they depend on the geometry of the piping system.

Point 240 keeps the problem from looping ad infinitum. This probably indicates a piping system that will never work with the defined constraints. At this point the user has the option of easing the constraints, allowing the program to add additional piping elements in order to increase flexibility of the system, or exit. If more elements are added, the program is started from the top as shown in FIG. 2 and FIG. 3. When all of the elements are fitted end to end, they must fit between the two terminal points. Moving the equipment terminal points at this point in the design stage is very troublesome.

OPERATION

The terminal points and the branch connections of the piping system under consideration are indicated with icons on the CAD drawing. My program will glean the information from the CAD drawing so that the historical data base can be checked for a match. If a match is found, exit and plot the drawing or display it to the video monitor along with the previous system calculations. If no match is found, then the system is dismembered as shown in FIG. 7. Each subsystem is optimized if possible using the technique of FIG. 2 and FIG. 3. When all subsystems are optimized, then they are reconnected into the original system. The solved system is then plotted or displayed to a video monitor. The solved system is also stored in the historical data base.

CONCLUSION, RAMIFICATIONS, AND SCOPE OF INVENTION

Thus the reader will see that this method of attach will provide a means by which a piping system can be optimized for minimum weight and satisfy all of the constraints of the design. This will eliminate the hunt and peck systems now in use and will increase the efficiency of the personnel working on the project. While my above description contains many specifics, these should not be construed as limitations on the scope of the invention, but rather as an exemplification of one preferred embodiment thereof. Many other variations are possible. For example, The positioning of the structural supports to reduce the forces and moments at the terminal points could be included. The linearization of the constraints for for the input to the simplex method of optimization could be replaced by a non-linear algorithm such as GINO published by Lindo Systems Inc. Chicago Ill. Also vibration and wind loading constraints could be added to increase the versatility of the invention. Accordingly, the scope of the invention should be determined not by the embodiments illustrated, but by the appended claims and their legal equivalents.

I claim:

1. An optimizing method for minimizing the weight of a many terminal piping system comprising:

a step of translating information corresponding to the many terminal piping system into a computer discernable input using a proprietary computer aided design program and storing the discernable input in a computer database, a conversational step by which an option can be selected from a plurality of options to control optimizing, a comparing step whereby said discernable input is compared to a historical database for a possible duplicate and if a possible duplicate is found then presenting optimizing information for minimizing the system weight and which is based on data in the historical database to a user, if no possible duplicate is found then dismembering the discernable input into data on a set of piping subsystems and storing the data in a second computer database, then performing an optimizing step responsive to the conversational step and the dismembering step to generate and store optimized data for minimizing the weight of each one of the piping subsystems, then performing a step of aggregating said optimized data for each piping subsystem to form optimized data for minimizing the weight of the terminal piping system, then performing a step of presenting the optimized data for minimizing the weight of the many terminal piping system to a user.

2. The method of claim 1 wherein said optimizing step further comprises using a linear or non-linear optimizer capable of retrieving information from said computer database.

3. The method of claim 1 wherein said optimizing step further comprises using a sorting program capable of comparing a piping subsystem to a historical database and making the results discernable to a user.

* * * * *